United States Patent [19]

Huang et al.

[11] 3,904,572
[45] Sept. 9, 1975

[54] COLD-SETTING COATING COMPOSITION BASED ON HYDROXY-CONTAINING VINYL POLYMER

[75] Inventors: Ching Yun Huang, Minoo; Naomitsu Takashina, Fujisawa; Senzo Shimizu, Chigasaki; Masahiro Shimoi, Hiratsuka; Masuya Ikegami, Chigasaki; Naoki Iwasaki, Hiratsuka; Rokuro Fujita, Chigasaki; Tadaaki Marushima, Hatano; Hisashi Katayama; Mitsuhiko Masumoto, both of Yamakita, all of Japan

[73] Assignee: Mitsubishi Gas Chemical Company, Inc., Japan

[22] Filed: Apr. 12, 1973

[21] Appl. No.: 350,479

[30] Foreign Application Priority Data

Apr. 20, 1972 Japan................................ 47-39130

[52] U.S. Cl. ... 260/31.2 MR; 260/31.6; 260/32.8 A; 260/33.2; 260/33.4 PQ; 260/33.6 PQ; 260/33.6 UA; 260/33.8 UA; 260/80.7; 260/80.75; 260/82.1; 260/83.5; 260/429.5

[51] Int. Cl. ... C08c 11/36; C08f 15/62; C08f 17/00

[58] Field of Search ..... 260/31.2 MR, 31.6, 32.8 A, 260/33.2, 33.4 PQ, 33.6 PQ, 33.6 UA, 33.8 UA, 429.5, 80.7, 80.75, 82.1, 83.5

[56] References Cited
UNITED STATES PATENTS 3,632,546   1/1972   Huang & Shimoi........ 260/31.2 MR

OTHER PUBLICATIONS

Feld et al., *The Organic Chemistry of Titanium* (Butterworths, 1965), pp. 70, 72–73, 171–172 (QD412 T6 F4 C.2).

Harwood, *Industrial Application of Organometallic Compounds* (Reinhold, 1963), pp. 240–244, 246–247, 252–253, 259, 265–269, 271, 355–356 (TP247 H38 C.2).

Turner et al., in J. Oil & Colour Chem. Association, 41, 769–779 (1958).

Chem. Abs. 66: P11399a; 67: P22563w; 68: 78962p; 73: P56831w; 74: 32278r.

*Primary Examiner*—Melvin Goldstein
*Assistant Examiner*—T. DeBenedictis, Sr.
*Attorney, Agent, or Firm*—Armstrong, Nikaido & Wegner

[57] ABSTRACT

A one-pack type, cold-setting composition comprising (1) a copolymer of at least one α, β-ethylenically unsaturated monomer or conjugated diene monomer and at least one α,β-ethylenically unsaturated hydroxy compound, (2) a curing agent, and (3) a organic solvent, characterized in that the above curing agent is a complex of (a) an alkyl or alkenyl titanate with (b) at least one glycol and/or (c) at least one α-hydroxycarboxylate or a mixture of the above (a) component with the above (b) component and/or the above (c) component, the amount of said complex being 0.1 to 5.0 moles per equivalent of the hydroxy group of the copolymer or the amount of the above mixture being such that the (a) component is present in an amount of 0.1 to 5.0 moles per equivalent of the hydroxy group of the copolymer, and the (b) and/or (c) component is present in an amount of from 0.5(m+1) to 2(m+2) moles per mole of the (a) component. The above coating composition is colorless and transparent and the cured film obtained therefrom has excellent in resistance to weathering, solvents and chemicals and also has excellent adhesion, gloss and hardness.

12 Claims, No Drawings ated as curing components, it is necessary, in order to form films satisfactory in properties, that the compositions are subjected to baking treatment at 150°C or more, desirably at a temperature of 150° to 180°C, for about 10 to 30 minutes. This greatly restricts the uses of said compositions as coating materials. In case isocyanate have been incorporated, the compositions can be cured at normal temperature without any heat treatment. In this case, however, the compositions are used as the two-package type, in general, and there has been adopted such a procedure that the curing components are incorporated immediately before use of the compositions. Accordingly, such two-package type, cold-setting coating compositions encounter problems with respect to storage stability after incorporation of curing components and are quite inconvenient in handling.

COLD-SETTING COATING COMPOSITION BASED ON HYDROXY-CONTAINING VINYL POLYMER

This invention relates to a one-package type coating composition. More particularly, the invention pertains to a coating composition comprising a vinyl polymer having hydroxy groups and a complex compound of (a) a titanate with (b) at least one glycol and/or (c) at least one α-hydroxycarboxylate, or a mixture of the (a) component with the (b) component and/or the (c) component.

Coating materials based on vinyl polymers having hydroxy groups, particularly acrylic polymers, have heretofore been widely used because of their being colorless and transparent and being excellent in resistance to weathering, chemicals; etc. However, vinyl polymers of this kind are thermoplastic, and hence are limited in uses. Accordingly, it has been an ordinary practice to adopt such procedure that the polymers are allowed to take a three-dimentional network by incorporation of curing agents. As procedures for allowing the polymers to take a three-dimensional network, there have been made many such attempts that vinyl copolymers obtained by copolymerizing the said polymers with vinyl monomers having carboxyl or hydroxy groups are incorporated with melamine resins, epoxy resins or isocyanates as curing components, and the resulting thermosetting acrylic resin compositions are used. However, cured films formed by use of said acrylic resin compositions, which have been obtained according to such conventional procedures as above, have such a drawback that they are degraded in surface gloss when exposed to ultraviolet rays.

In case melamine or epoxy resins have been incorporated as curing components, it is necessary, in order to form films satisfactory in properties, that the compositions are subjected to baking treatment at 150°C or more, desirably at a temperature of 150° to 180°C, for about 10 to 30 minutes. This greatly restricts the uses of said compositions as coating materials. In case isocyanate have been incorporated, the compositions can be cured at normal temperature without any heat treatment. In this case, however, the compositions are used as the two-package type, in general, and there has been adopted such a procedure that the curing components are incorporated immediately before use of the compositions. Accordingly, such two-package type, cold-setting coating compositions encounter problems with respect to storage stability after incorporation of curing components and are quite inconvenient in handling.

As a means for producing a cured product excellent in resistance to ultraviolet rays, chemicals and staining, without using amino resins, such as urea resins and melamine resins, or epoxy resins as mentioned above, there has been known the use of a resin composition prepared by incorporating into an acrylic polymer having epoxy or hydroxy groups a curing component comprising an intramolecular complex compound in which the valency and coordination number of central metal have completely been satisfied by a carboxylate having a carbonyl or hydroxy group at the β-position (Japanese Pat. No. 585,220). This coating composition, however, is also required to be subjected to heat treatment at 150° to 180°C for 10 to 30 minutes, in general. Further, in case an intramolecular complex compound, in which the valency and coordination number of titanium have completely been satisfied by a carboxylate having a carbonyl or hydroxy group at the β-position, is used as the curing component in the above-mentioned coating composition, the curing component itself ordinarily exhibits a markedly deep yellowish brown or reddish brown color. Thus, the acrylic resin as a clear varnish is greatly deteriorated in such characteristics as colorlessness and transparency due to incorporation of the curing component. Accordingly, the proportion of the curing component to be incorporated into the resin is spontaneously restricted.

For the above reasons, the advent of a one-package type coating composition, which has less colorability when used as a clear varnish, is cold-setting, and is excellent in resistance to weathering and chemicals and in physical properties, has strongly been desired for a long period of time in the field of acrylic coating compositions.

The present inventors made extensive research on one-package type acrylic coating compositions which could be cured during drying at ordinary temperature to form films excellent in resistance to weathering, chemicals and solvents and in physical properties. As a result, the inventors have found that a one-package type, cold-setting coating composition, which has substantially no colorability when used as a clear varnish and is excellent in stability even when stored over a long period of time, can be obtained by incorporating into a vinyl copolymer having hydroxy groups a complex compound of (a) a titanate with (b) a glycol and/or (c) an α-hydroxycarboxylate, or a mixture of the (a) component with the (b) component and/or the (c) component.

In accordance with the present invention, there is provided a coating composition comprising (1) a vinyl copolymer having hydroxy groups, (2) a complex compound of (a) a titanate represented by the formula,

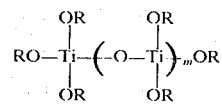

wherein R is an alkyl group having 1 to 20 carbon atoms, preferably 1 to 16 carbon atoms, more preferably 1 to 5 carbon atoms, or an alkenyl group having 2 to 20 carbon atoms, preferably 2 to 16 carbon atoms, more preferably 2 to 5 carbon atoms; and $m$ is zero or an integer of 1 to 20, preferably 1 to 10, more preferably 1 to 3, with (b) at least one glycol and/or (c) at least one α-hydroxycarboxylate, or a mixture of the (a) component with the (b) component and/or the (c) component, and (3) a organic solvent.

The term "the mixture of (a) a titanate with (b) a glycol and/or (c) an α-hydroxycarboxylate" referred to herein signifies not only a mere mixture of the (a) component with the (b) component and/or the (c) component, but also a mixture comprising partly a complex compound or reaction product of the (a) component with the (b) component and/or the (c) component, and an alcohol formed due to reaction of the (a) component with the (b) component and/or the (c) component. In the present invention, such a mixture as mentioned above effectively contributes as well to the curing of the coating composition.

The coating composition of the present invention is of the one-package type, has substantially no colorability when used as a clear varnish and is curable at ordinary temperature to form a tough film, which is excellent in resistance to weathering, chemicals and solvents and does not bring about any such phenomenon as degradation in gloss of cured film due to ultraviolet rays. Further, the coating composition of the present invention is excellent in storage stability. The coating composition of the invention is useful for application to automotive bodies, electric household appliances and furniture.

When the coating composition of the present invention is applied by spraying or dipping to a substrate to be coated, a film is formed due to volatilization of volatiles in the composition, and the film cures three-dimensionally to give a cured film excellent in resistance to weathering, chemicals and solvents and prominent in adhesion, gloss, hardness and the like film properties. The coating composition of the present invention easily brings about cross-linking to form a cured film having sufficient film properties. The composition can be further enhanced in film properties when it is subjected to after-treatment at a temperature of 50° to 100°C after volatilization of volatiles. In case the composition is treated at a temperature higher than said temperature, the time required for film formation can be shortened. Alternatively, the coating composition of the present invention can, of course, be cured according to thermal curing procedure.

The coating composition of the present invention is prepared by mixing a organic solvent of a vinyl polymer having hydroxy groups with the aforesaid complex compound in an amount of 0.1 to 5.0 moles per equivalent of the hydroxy groups of said polymer, or with a mixture of 0.1 to 5.0 moles of an alkyl or alkenyl titanate and at least one glycol and/or at least one α-hydroxycarboxylate in an amount of from 0.5(m+1) to 2(m+2) moles wherein m has the same meaning as in the above-mentioned formula of the titanate per mole of said alkyl or alkenyl titanate.

The thus obtained coating composition of the present invention shows an extremely favorable storage stability and does not cause denaturation or gelation even when stored over a long period of time.

The vinyl polymer having hydroxy groups which is used in the coating composition of the present invention is a copolymer obtained by copolymerizing at least one α, β-ethylenically unsaturated monomer or conjugated diene monomer with at least one α, β-ethylenically unsaturated hydroxy compound. Examples of the ethylenic or diene monomer include ethylene, propylene, butadiene, isoprene, chloroprene, styrene, α-methylstyrene, dimethylstyrene, vinyltoluene, vinyl acetate, vinyl propionate, vinyl chloride, vinyl ether, vinylidene chloride, $C_1$–$C_{12}$ alkyl acrylates such as methyl acrylate, ethyl acrylate, butyl acrylate, 2-ethylhexyl acrylate and lauryl acrylate, and $C_1$–$C_{12}$ alkyl methacrylates such as methyl methacrylate, ethyl methacrylate, butyl methacrylate, 2-ethylhexyl methacrylate and lauryl methacrylate. Examples of the α, β-ethylenically unsaturated hydroxy compound include hydroxyalkyl($C_1$–$C_4$) acrylates and methacrylates, such as 2-hydroxyethyl methacrylate, 2-hydroxyethyl acrylate, 2-hydroxypropyl methacrylate, 2-hydroxypropyl acrylate, 4-hydroxybutyl acrylate, and 4-hydroxybutyl methacrylate; 3-chloro-2-hydroxyalkyl($C_3$–$C_4$) acrylates and methacrylates, such as 3-chloro-2-hydroxypropyl methacrylate and 3-chloro-2-hydroxypropyl acrylate; allyl alcohol; N-methylol acrylamide and N-methylol methacrylamide. The amount of the α,β-ethylenically unsaturated hydroxy compound is preferably from 2 to 30% by weight based on the total weight of the monomers.

The vinyl polymer having hydroxy groups which is used in the coating composition of the present invention is usually obtained by solution polymerization in a organic solvent. Alternatively, there may be used a organic solvent of a polymer obtained by other polymerization procedures than solution polymerization, e.g. bulk polymerization, suspension polymerization or emulsion polymerization. Examples of the polymerization initiator, which is used in preparing the above-mentioned polymer to be used in the present invention, include conventional free radical polymerization initiators such as organic peroxides, azonitrile compounds, etc., and redox catalyst systems. Examples of the solvent, which is used in the solution polymerization or which is used in preparing the non-aqueous solution of a polymer obtained according to other polymerization procedures, include aromatic hydrocarbons such as benzene, toluene and xylene; ketones such as methyl ethyl ketone, methyl isobutyl ketone and cyclic ketones, e.g. cyclohexanone; alcohols such as aliphatic alcohols having 1 to 6 carbon atoms and alicyclic alcohols, e.g. cyclohexanol; esters such as alkyl acetates, e.g. methyl acetate, ethyl acetate, butyl acetate and amyl acetate; ethers such as dimethyl ether, methyl ethyl ether, diethyl ether and cellosolve; and petroleum solvents such as solvent naphtha and mineral spirits. These solvents may be used either singly or in admixture of two or more. In the present invention, the polymers are usually used in the form of organic solvent in these solvents.

The titanate used in the present invention is a compound represented by the aforesaid formula, and examples thereof include tetraethyl titanate, tetraisopropyl titanate, tetrabutyl titanate, tetra(2-ethylhexyl) titanate, tetrastearyl titanate, tetrallyl titanate and tetra-1-butenyl titanate, and dimers and trimers of said titanates.

The glycol used in the present invention is an aliphatic or alicyclic glycol having 2 to 12 carbon atoms, and examples thereof include ethylene glycol, diethylene glycol, triethylene glycol, 1,2-propylene glycol, 1,3-propylene glycol, 1,3-hexylene glycol, 1,3-octylene glycol, neopentyl glycol and cyclohexanediol. These may be used alone or in combination of two or more.

The α-hydroxycarboxylate used in the present invention is an α-hydroxycarboxylate having 2 to 12 carbon atoms, and examples thereof include lactates such as methyl lactate, ethyl lactate and butyl lactate; α-hydroxy-n-butyrates such as methyl α-hydroxy-n-butyrate, ethyl α-hydroxy-n-butyrate and butyl α-hydroxy-n-butyrate; α-hydroxy-n-caproates such as methyl α-hydroxy-n-caproate, ethyl α-hydroxy-n-caproate and butyl α-hydroxy-n-caproate; and α-hydroxy-n-caprylates such as methyl α-hydroxy-n-caprylate and ethyl α-hydroxy-n-caprylate. These may be used alone or in combination of two or more.

The complex compound of the aforesaid titanate (a) with the glycol (b) and/or the α-hydroxycarboxylate (c) which is used in the present invention is a compound easily obtainable by reacting at room temperature the compound (a) with the compound (b) and/or the compound (c), and a part or all of the alkoxy or alkenoxy groups of the titanate have been replaced by the glycol and/or the α-hydroxycarboxylate to form a chelate ring. The complex compound obtained by reacting the titanate with the glycol and/or the α-hydroxycarboxylate varies in reactivity with the vinyl polymer used in the present invention, depending on the residual amount of alkoxy or alkenoxy groups of the titanate. That is, the greater the residual amount of alkoxy or alkenoxy groups, the higher the complex compound in reactivity with the vinyl polymer. The mixture of the titanate with the glycol and/or the α-hydroxycarboxylate also shows the tendency that the smaller the proportion of the latter, the higher the mixture in reactivity with the vinyl polymer. Further, the shorter the chain of alkyl or alkenyl groups of the titanate, the higher the mixture in reactivity. If the complex compound or the mixture is excessively high in reactivity, there are some cases where no favorable film is obtained because curing reaction proceeds prior to formation of a smooth film surface in the drying step. Further, in some cases, the complex compound or the mixture gels partly. In such cases, the complex compound or the mixture is further incorporated with the glycol or the α-hydroxycarboxylate, whereby the reactivity thereof can be suppressed.

Taking the above-mentioned facts into consideration, the type and amount of the complex compound or mixture, which is to be incorporated into the coating composition of the present invention, should be suitably selected according to the kind and content of hydroxy compound in the vinyl polymer.

Although the crosslinking agent of the coating composition of the present invention is not always clear, it is considered that the composition in the solution state might differ from the composition after application in equilibrium between the hydroxy groups in the vinyl polymer and the complex compound or mixture, with the result that the composition is stable in solution but, after application and during drying of the composition, the equilibrium is shifted owing to volatilization of the glycol and/or the α-hydroxycarboxylate, the solvent and the alcohols prepared by reacting the titanate with the glycol and/or α-hydroxycarboxylate, whereby a bond is formed between the metallic titanium and the hydroxy groups to form a three-dimensional network.

The cured film thus obtained is no longer soluble in organic solvents such as aromatic hydrocarbons, ketones, esters and ethers, nor is attacked by gasoline, machine oil and kerosene, and is excellent in resistance to weathering, chemicals and solvents and in adhesion, is scarcely colored, and is prominent in gloss and hardness.

The present invention is illustrated in more detail below with reference to examples, in which all parts are by weight.

EXAMPLE 1

A mixture of 260 parts of toluene and 90 parts of n-butanol was charged into a glass flask. After flushing the flask with nitrogen gas, the inner temperature of the flask was elevated to the azeotropic temperature of the toluene-n-butanol mixture to maintain the mixture in a reflux state. Into the flask was then dropped over a period of polymerization 3 hours a mixed solution of 240 parts of methyl methacrylate, 300 parts of n-butyl acrylate, 90 parts of 2-hydroxyethyl methacrylate and 7 parts of dicumyl peroxide. After completion of the dropping, the reaction was continued for an additional 4 hours, whereby the conversion became substantially 100%. At this stage, a mixture of 220 parts of toluene and 70 parts of n-butanol was added to the plymerization solution to obtain a colorless, transparent resin solution having a non-volatile content of 50%. The Gardner-Holdt viscosity of this resin solution was $Z-Z_1$ at 25°C. To 100 parts of the resin solution were added 11 parts of n-butanol and 26.7 parts of a reaction mixture prepared by reacting 18.45 parts of tetrabutyl titanate with 8.25 parts of 1,2-propanediol, and the resulting mixture was thoroughly stirred to obtain a substantially colorless, transparent, cold-setting, clear varnish having a Gardner-Holdt viscosity of T-U (25°C). The color number of the thus obtained clear varnish was less than 1 in terms of Gardner color number. The storage stability of the clear varnish was tested at room temperature for 3 months and at 50°C for 30 days, but no viscosity increase amd the like changes were observed at all. The clear varnish was mixed with rutile-type titanium dioxide in a proportion of 30 parts per 50 parts of the non-volatile content of the varnish, and the resulting mixture was kneaded by means of a 3-roll mill to obtain a white enamel. This enamel was diluted with a thinner to a suitable viscosity, coated on a phosphate-treated steel plate, and then dried at ordinary temperature (20°C) for 24 hours to form a film. The properties of the thus formed film were as set forth in Table 1, Column A.

EXAMPLE 2

A mixture of 35 parts of mixed xylene and 10 parts of n-butanol was charged into a glass flask. After flushing the flask with nitrogen gas, the inner temperature of the flask was elevated to the azeotropic temperature of the mixed xylene-n-butanol mixture to maintain the mixture in a reflux state. Into the flask was then dropped over a period of about 2 hours a mixed solution consisting of 25 parts of methyl methacrylate, 5 parts of styrene, 15 parts of butyl acrylate, 8 parts of 2-hydroxypropyl acrylate and 0.5 part of t-butyl peroxybenzoate. After completion of the dropping, the reaction was further continued for an additional 4 hours to obtain with a conversion of about 100% a colorless, transparent resin solution having a non-volatile content of 55%. The Gardner-Holdt viscosity of this resin solution was W-X at 25°C. To 100 parts of the resin solution were added 21 parts of mixed xylene, 7 parts of n-butanol and 44.1 parts of a reaction mixture prepared by reacting 16.6 parts of tetraisopropyl titanate with 27.5 parts of ethyl lactate, and the resulting mixture was thoroughly stirred to obtain a substantially colorless, transparent, cold-setting, clear varnish having a Gardner-Holdt viscosity of R-S (25°C). The color number of the thus obtained clear varnish was less than 1 in terms of Gardner color number. The storage stability of the clear varnish was tested at room temperature for 6 months and at 50°C for 30 days, but neither viscosity increase nor other changes were observed at all. The clear varnish was mixed with rutile-type titanium dioxide in a proportion of 40 parts per 50 parts of the non-volatile content of the varnish, and the resulting mixture was kneaded by means of a 3-roll mill to obtain a white enamel. This enamel was diluted with a thinner to a suitable viscosity, coated on a phosphate-treated steel plate, and then dried at ordinary temperature (20°C) for 24 hours to form a film. The properties of the thus formed film were as set forth in Table 1, Column B.

EXAMPLE 3

90 Parts of mixed xylene was charged into a glass flask. After flushing the flask with nitrogen gas, the inner temperature of the flask was elevated to 90°C. Into the flask was then dropped from one side over a period of about 2 hours a mixed solution consisting of 24 parts of styrene, 48 parts of butyl methacrylate, 24 parts of ethyl acrylate, and 1.5 parts of benzoyl peroxide, and was simultaneously dropped from the other side over a period of about 2 hours a solution of 11 parts of N-methylol acrylamide in 50 parts of isopropyl alcohol. After completion of the dropping, the reaction was further continued for an additional 2 hours. Thereafter, 1.5 parts of benzoyl peroxide and 10 parts of mixed xylene were further added to the system, and the reaction was conducted for about 4 hours to obtain with a conversion of substantially 100% a colorless, transparent resin solution having a non-volatile content of 46%. The Gardner-Holdt viscosity of this resin solution was $Z_2$-$Z_3$ at 25°C. To 100 parts of the resin solution were added 50 parts of mixed xylene and 29.6 parts of a complex compound prepared by reacting 26.2 parts of tetrabutyl titanate with 9.1 parts of 2-methyl-2,4-pentanediol and removing 5.7 parts of n-butanol by distillation, and the resulting mixture was thoroughly stirred to obtain a substantially colorless, transparent, cold-setting, clear varnish having a Gardner-Holdt viscosity of U-V (25°C). The storage stability of the clear varnish was tested at room temperature for 1 month and at 50°C for 20 days, but neither viscosity increase nor other changes were observed at all. The clear varnish was mixed with rutile-type titanium oxide in a proportion of 30 parts per 50 parts of the non-volatile content of the varnish, and the resulting mixture was kneaded by means of a 3-roll mill to obtain a white enamel. This enamel was spray-coated on a phosphate-treated steel plate, and then dried at 80°C for 5 minutes to form a film. The properties of the thus formed film were as set forth in Table 1, Column C.

EXAMPLE 4

A mixed solution consisting of 50 parts of toluene, 25 parts of methyl ethyl ketone, 25 parts of isopropyl alcohol, 50 parts of styrene, 10 parts of methyl acrylate, 25 parts of butyl acrylate, 15 parts of allyl alcohol and 1.5 parts of azobisisobutyronitrile was charged into a glass flask, and the inner temperature of the flask was controlled to 75°C. The mixed solution was reacted for 6 hours while introducing nitrogen gas into the flask. Thereafter, 1.5 parts of azobisisobutyronitrile was further charged into the flask, and the reaction was continued for about 5 hours to obtain with a conversion of substantially 100% a colorless, transparent resin solution having a non-volatile content of 50%. The Gardner-Holdt viscosity of this resin solution was T-U (25°C). To 100 parts of the resin solution was added 22.8 parts of a reaction mixture prepared by reacting 10.9 parts of tetraisopropyl titanate with 11.9 parts of methyl lactate, and the resulting mixture was thoroughly stirred to obtain a substantially colorless, transparent, cold-setting, clear varnish having a Gardner-Holdt viscosity of N-O (25°C). The clear varnish was mixed with rutile-type titanium oxide in a proportion of 40 parts per 50 parts of the non-volatile content of the varnish, and the resulting mixture was kneaded by means of a 3-roll mill to obtain a white enamel. This enamel was coated on a phosphate-treated steel plate, and then dried at 80°C for 5 minutes to form a film. The properties of the thus formed film were as set forth in Table 1, Column D.

EXAMPLE 5

A mixture of 60 parts of mixed xylene and 20 parts of n-butanol was charged into a glass flask. After flushing the flask with nitrogen gas, the inner temperature of the flask was elevated to the azeotropic temperature of the mixed xylene-n-butanol mixture to maintain the mixture in a reflux state. Into the flask was then dropped over a period of about 3 hours a mixed solution consisting of 40 parts of methyl methacrylate, 5 parts of ethyl acrylate, 85 parts of butyl acrylate, 25 parts of 2-hydroxyethyl methacrylate and 1 part of t-butyl peroxybenzoate. After completion of the dropping, the reaction was further continued for 8 hours to obtain with a conversion of substantially 100% a colorless, transparent resin solution having a non-volatile content of 65%. The Gardner-Holdt viscosity of this resin solution was X-Y at 25°C. To 100 parts of the resin solution were added 100 parts of mixed xylene, 30 parts of n-butanol and 83.6 parts of a complex compound prepared by reacting 83.1 parts of tetrabutyl titanate with 15.3 parts of 1,2-propanediol and removing 14.8 parts of n-butanol by distillation, and the resulting mixture was thoroughly stirred to obtain a substantially colorless, transparent, cold-setting, clear varnish having a Gardner-Holdt viscosity of L-M (25°C). The storage stability of the clear varnish was tested at room temperature for 12 months and at 50°C for 30 days, but neither viscosity increases nor other changes were observed at all. The clear varnish was mixed with rutile-type titanium dioxide in a proportion of 30 parts per 50 parts of the non-volatile content of the varnish, and the resulting mixture was kneaded by means of a 3-roll mill to obtain a while enamel. This enamel was diluted with a thinner to a suitable viscosity, coated on a phosphate-treated steel plate and then dried at ordinary temperature (20°C) for 24 hours to form a film. The properties of the thus formed film were as set forth in Table 1, Column E.

EXAMPLE 6

A mixed solution consisting of 50 parts of toluene, 20 parts of methyl isobutyl ketone, 20 parts of n-butanol, 10 parts of n-butyl acetate, 40 parts of vinyltoluene, 50 parts of methyl acrylate, 10 parts of N-methylol acrylamide, 1 part of benzoyl peroxide and 1 part of cumene hydroperoxide was charged into a glass flask, and the inner temperature of the flask was controlled to 80°C. The mixed solution was reacted for 10 hours while introducing nitrogen gas into the flask to obtain with a conversion of substantially 100% a colorless, transparent resin solution having a non-volatile content of 50%. The Gardner-Holdt viscosity of this resin solution was Z-$Z_1$ (25°C). To 100 parts of the resin solution were added 20 parts of mixed xylene and 21.6 parts of a reaction mixture prepared by reacting 10.5 parts of tetrabutyl titanate dimer with 11.1 parts of 2-ethyl-1,3-hexanediol, and the resulting mixture was thoroughly stirred to obtain a substantially colorless, transparent, cold-setting, clear varnish having a Gardner-holdt viscosity of R-S (25°C). The clear varnish was mixed with rutile-type titanium oxide in a proportion of 40 parts per 50 parts of the non-volatile content of the varnish, and the resulting mixture was kneaded by means of a 3-roll mill to obtain a white enamel. This enamel was coated on a phosphatetreated steel plate, and then dried at 80°C for 5 minutes to form a film. The properties of the thus formed film were as set forth in Table 1, Column F.

EXAMPLE 7

To 100 parts of the resin solution obtained in Example 1 were added 21.7 parts of mixed xylene and 21.7 parts of a complex compound prepared by reacting 12.3 parts of tetraispropyl titanate with 17.2 parts of ethyl α-hydroxybutyrate and removing 7.8 parts of isopropyl alcohol by distillation, and the resulting mixture was thoroughly stirred to obtain a substantially colorless, transparent, cold-setting, clear varnish having a Gardner-Holdt viscosity of V-W (25°C). This clear varnish was mixed with rutiletype titanium oxide in a proportion of 40 parts per 50 parts of the volatile content of the varnish, and the resulting mixture was kneaded by means of a 3-roll mill to obtain a white enamel. This enamel was coated on a phosphate-treated steel plate, and then dried at 20°C for 24 hours to form a film. The properties of the thus formed film were as set forth in Table 1, Column G.

EXAMPLE 8

To 100 parts of the resin solution obtained in Example 2 were added 15.8 parts of n-butanol and 29.9 parts of a reaction mixture prepared by reacting 17.8 parts of tetraisopropyl titanate with 7.4 parts of ethyl lactate and 4.7 parts of 1,2-propanediol, and the resulting mixture was thoroughly stirred to obtain a substantially colorless, transparent, cold-setting, clear varnish having a Gardner-Holdt viscosity of U-V (25°C). The clear varnish was mixed with rutile-type titanium oxide in a proportion of 40 parts per 50 parts of the non-volatile content of the varnish, and the resulting mixture was kneaded by means of a 3-roll mill to obtain a white enamel. This enamel was coated on a phosphate-treated steel plate, and then dried at 20°C for 24 hours to form a film. The properties of the thus formed film were as set forth in Table 1, Column H.

EXAMPLE 9

A mixed solution consisting of 40 parts of toluene, 20 parts of ethyl acetate, 10 parts of methyl isobutyl ketone, 30 parts of n-butanol, 35 parts of styrene, 10 parts of methyl methacrylate, 5 parts of ethyl acrylate, 35 parts of butyl acrylate, 15 parts of 2-hydroxyethyl methacrylate and 1.0 part of benzoyl peroxide was charged into a glass flask, and after flushing the flask with nitrogen gas, the inner temperature of the flask was controlled to 70°C. After reacting the mixed solution for 8 hours, 0.5 part of benzoyl peroxide was further added, and the reaction was further conducted for about 8 hours to obtain with a conversion of substantially 100% a colorless, transparent resin solution having a non-volatile content of 50%. The Gardner-Holdt viscosity of this resin solution was U-V (25°C). To 100 parts of the resin solution were added 36.9 parts of mixed xylene and 36.9 parts of a complex compound prepared by reacting 29.2 parts of tetrabutyl titanate with 20.3 parts of ethyl lactate and 9.5 parts of 1,2-propanediol and removing 19.1 parts of n-butanol by distillation, and the resulting mixture was thoroughly stirred to obtain a substantially colorless, transparent, cold-setting, clear varnish having a Gardner-Holdt viscosity of T-U (25°C). This clear varnish was mixed with rutile-type titanium oxide in a proportion of 30 parts per 50 parts of the non-volatile content of the varnish, and the resulting mixture was kneaded by means of a 3-roll mill to obtain a white enamel. This enamel was coated on a phosphate-treated steel plate, and then dried at ordinary temperature (20°C) for 24 hours to form a film. The properties of the thus formed film were as set forth in Table 1, Column I.

EXAMPLE 10

A mixture of 40 parts of mixed xylene, 20 parts of butyl acetate and 40 parts of n-butanol was charged into a glass flask. After flushing the flask with nitrogen gas, the inner temperature of the flask was elevated to the reflux temperature of the said mixture to maintain the mixture in a reflux state. Into the flask was then dropped over a period of about 3 hours a mixed solution consisting of 30 parts of methyl methacrylate, 10 parts of methyl acrylate, 20 parts of 2-ethylhexyl acrylate, 20 parts of 2-hydroxypropyl methacrylate and 1.0 part of t-butyl peroxybenzoate. After completion of the dropping, the reaction was further continued for 4 hours to obtain with a conversion of substantially 100% a colorless, transparent resin solution having a nonvolatile content of 45%. The Gardner-Holdt viscosity of this resin solution was $Z_1-Z_2$ at 25°C. To 100 parts of the resin solution were added 50.0 parts of mixed xylene and 106.8 parts of a reaction mixture prepared by reacting 79.2 parts of tetrahexyl titanate with 9.5 parts of ethylene glycol and 18.1 parts of methyl α-hydroxybutyrate, and the resulting mixture was thoroughly stirred to obtain a substantially colorless, transparent, cold-setting, clear varnish having a Gardner-Holdt viscosity of X-Y (25°C). This clear varnish was mixed with rutile-type titanium oxide in a proportion of 40 parts per 50 parts of the non-volatile content of the varnish, and the resulting mixture was kneaded by means of a 3-roll mill to obtain a white enamel. This enamel was diluted with a thinner to a suitable viscosity, coated on a phosphate-treated steel plate, and then dried at ordinary temperature (2020) for 24 hours to form a film. The properties of the thus formed film were as set forth in Table 1, Column J.

EXAMPLE 11

A mixed solution consiting of 10 parts of mixed xylene, 20 parts of toluene, 10 parts of cellosolve acetate, 50 parts of isobutanol, 25 parts of styrene, 10 parts of ethyl acrylate, 20 parts of methyl methacrylate, 15 parts of 2-hydroxyethyl acrylate, 2.0 parts of azobisisobutyronitrile and 1.0 part of cumene hydroperoxide was charged into a glass flask, and the inner temperature of the flask was controlled to 80°C. The mixed solution was reacted for 14 hours, while introducing nitrogen gas into the flask, to obtain with a conversion of substantially 100% a colorless, transparent resin solution having a non-volatile content of 42%. The Gardner-Holdt viscosity of this resin solution was V-W at 25°C. To 100 parts of the resin solution were added 40 parts of toluene and 70.2 parts of a reaction mixture prepared by reacting 44.8 parts of tetraoctyl titanate with 25.4 parts of ethyl α-hydroxy-n-caproate, and the resulting mixture was thoroughly stirred to obtain substantially colorless, transparent, cold-setting, clear varnish having a Gardner-Holdt viscosity of Q-R (25°C). The color number of this clear varnish was less than 1 in terms of Gardner color number. The clear varnish was mixed with rutile-type titanium oxide in a proportion of 40 parts per 50 parts of the non-volatile content of the varnish, and the resulting mixture was kneaded by means of a 3-roll mixture to obtain a white enamel. This enamel was coated on a phosphate-treated steel plate, and then dried at 80°C for 5 minutes to form a film. The properties of the thus formed film were as set forth in Table 1, Column K.

50°C for 30 days, but neither viscosity increase nor other changes were observed at all.

What is claimed is:

1. A one-package type, cold-setting coating composition comprising (1) a copolymer of at least one α,β-ethylenically unsaturated monomer or conjugated diene monomer selected from the group consisting of ethylene, propylene, butadiene, isoprene, chloroprene, styrene, α-methylstyrene, dimethylstyrene, vinyltoluene, vinyl acetate, vinyl propionate, vinyl chloride, vinyl ether, vinylidene chloride, acrylonitrile, methacrylonitrile, alkyl acrylates and alkyl methacrylates and Table 1

|  | A | B | C | D | E | F | G | H | I | J | K |
|---|---|---|---|---|---|---|---|---|---|---|---|
| Hardness 1) | HB | H | H | H | HB | 2H | HB | H | H | HB | 2H |
| Gloss (60°) | 88 | 90 | 92 | 94 | 85 | 87 | 87 | 90 | 95 | 85 | 94 |
| Erichsen (mm) | 7 | 7 | 7 | 5 | 7 | 5 | 7 | 7 | 7 | 7 | 5 |
| Cross-cut | 100/100 | 100/100 | 100/100 | 100/100 | 100/100 | 100/100 | 100/100 | 100/100 | 100/100 | 100/100 | 100/100 |
| Du Pont impact test, 500 g ½ in. (cm) | 50 | 10 | 30 | 10 | 20 | 20 | 50 | 20 | 30 | 40 | 20 |
| Bending resistance (mm) | 2 | 3 | 2 | 8 | 4 | 3 | 2 | 2 | 2 | 2 | 4 |
| Acid resistance 2) | Good | Good | Good | Good | Good | Good | Good | Good | Good | Good | Good |
| Alkali resistance 3) | Good | Good | Good | Good | Good | Good | Good | Good | Good | Good | Good |
| Gasoline resistance 4) | Good | Good | Good | Good | Good | Good | Good | Good | Good | Good | Good |
| Salt spray | Good | Good | Good | Good | Good | Good | Good | Good | Good | Good | Good |
| Ultraviolet resistance 5) | Unchanged | Unchanged | Unchanged | Unchanged | Unchanged | Unchanged | Unchanged | Unchanged | Unchanged | Unchanged | Unchanged |
| Color no. of clear varnish 6) | <1 | <1 | <1 | <1 | <1 | <1 | <1 | <1 | <1 | <1 | <1 |

1) Pencil hardness.
2) After immersion in a 5% aqueous $H_2SO_4$ solution for 7 hours.
3) After immersion in a 3% aqueous NaOH solution for 7 hours.
4) After immersion in "Idemitsu Hi-Octane" for 7 hours.
5) After irradiation with a germicidal lamp for 24 hours.
6) Gardner color number.

EXAMPLE 12

To 100 parts of the resin solution obtained in Example 1 were added 11 parts of n-butanol and 26.7 parts of a reaction mixture prepared by reacting 18.45 parts of tetrabutyl titanate with 8.25 parts of 1,2-propanediol and 14.5 parts of 2-ethyl-1,3-hexanediol, and the resulting mixture was thoroughly stirred to obtain a substantially colorless, transparent, cold-setting, clear varnish having a Gardner-Holdt viscosity of T-U (25°C). The color number of the thus obtained clear varnish was less than 1 in terms of Gardner color number. The storage stability of the clear varnish was treated at room temperature for 3 months and at 50°C for 30 days, but neither viscosity increase nor other changes were observed at all.

EXAMPLE 13

To 100 parts of the resin solution obtained in Example 2 were added 21 parts of mixed xylene, 7 parts of n-butanol and 44.1 parts of a reaction mixture prepared by reacting 16.6 parts of tetraisopropyl titanate with 13.8 parts of ethyl lactate and 14.1 parts of methyl lactate, and the resulting mixture was thoroughly stirred to obtain a substantially colorless, transparent, cold-setting, clear varnish having a Gardner-Holdt viscosity of R-S (25°C). The color number of the thus obtained clear varnish was less than 1 in terms of Gardner color number. The storage stability of the clear varnish was tested at room temperature for 6 months and at at least one α,β-ethylenically unsaturated hydroxy compound selected from the group consisting of hydroxyalkyl acrylates and methacrylates in which the alkyl group has 1 to 4 carbon atoms, 3-chloro-2-hydroxyalkyl acrylates and methacrylates in which the alkyl group has 3 to 4 carbon atoms, allyl alcohol, N-methylol acrylamide and N-methylol methacrylamide, (2) a crosslinking agent, and (3) an organic solvent, characterized in that the above crosslinking agent is a complex compound of (a) a titanate represented by the formula,

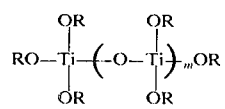

wherein R is an alkyl group having 1 to 20 carbon atoms or an alkenyl group having 2 to 20 carbon atoms; and $m$ is zero or an integer of 1 to 20; with (b) at least one glycol and/or (c) at least one alkyl α-hydroxycarboxylate or a mixture of the (a) component with the (b) component and/or the (c) component, the amount of said complex being 0.1 to 5.0 moles per equivalent of the hydroxy group of the copolymer or the amount of the mixture being such that the (a) component is present in an amount of 0.1 to 5.0 moles per equivalent of the hydroxy group of the copolymer and the (b) and/or (c) component is present in an amount of from 0.5(m+1) to 2(m+2) moles wherein m has the same meaning as in the above-mentioned formula of the titanate per mole of the (a) component.

2. A composition according to claim 1, wherein the amount of the α, β-ethylenically unsaturated hydroxy compound is 2 to 30% by weight of the total weight of all the monomers.

3. A composition according to claim 1, wherein the titanate is selected from the group consisting of tetraethyl titanate, tetraisopropyl titanate, tetrabutyl titanate, tetra-2-ethylhexyl titanate, tetrastearyl titanate, tetraallyl titanate, tetra-1-butenyl titanate, and dimers and trimers of these titanates.

4. A composition according to claim 1, wherein the R's of the titanate are alkyl groups having 1 to 20 carbon atoms.

5. A composition according to claim 1, wherein the glycol is selected from the group consisting of ethylene glycol, diethylene glycol, triethylene glycol, 1,2-propylene glycol, 1,3-propylene glycol, 1,3-hexylene glycol, 1,3-octylene glycol, neopentyl glycol and cyclohexanediol.

6. A composition according to claim 1, wherein the organic solvent is at least one member selected from the group consisting of aromatic hydrocarbons, halohydrocarbons, ketones, alcohols, ethers, esters and petroleum solvents.

7. A composition according to claim 1, wherein the ethylenically unsaturated monomer or conjugated diene monomer is at least one monomer selected from the group consisting of alkyl acrylates and methacrylates or a combination of said at least one monomer and at least one monomer selected from the group consisting of ethylene, propylene, butadiene, isoprene, chloroprene, styrene, α-methylstyrene, dimethylstyrene, vinyltoluene, vinyl acetate, vinyl propionate, vinyl chloride, vinyl ether, vinylidene chloride, acrylonitrile and methacrylonitrile.

8. A composition according to claim 1, wherein the ethylenically unsaturated monomer or conjugated diene monomer is at least one monomer slected from the group consisting of alkyl acrylates and methacrylates, wherein the alkyl group has up to 8 carbon atoms, or a combination of said at least one monomer and styrene or vinyltoluene.

9. A composition according to claim 1, wherein the alkyl α-hydroxycarboxylate is an alkyl α-hydroxycarboxylate having 2 to 12 carbon atoms.

10. A composition according to claim 9, wherein the alkyl α-hydroxycarboxylate is selected from the group consisting of alkyl lactates, alkyl α-hydroxy-n-butyrates, alkyl α-hydroxycaproates and alkyl α-hydroxy-n-caprylates.

11. A composition according to claim 9, wherein alkyl α-hydroxycarboxylate is selected from the group consisting of methyl lactate, ethyl lactate, propyl lactate, butyl lactate, methyl α-hydroxy-n-butyrate, ethyl α-hydroxy-n-butyrate, butyl α-hydroxy-n-butyrate, methyl α-hydroxy-n-caproate, ethyl α-hydroxy-n-caproate, butyl α-hydroxy-n-caproate, methyl α-hydroxy-n-caprylate and ethyl α-hydroxy-n-caprylate.

12. An article having on its surface a cured film of the composition of claim 1.

* * * * *